US 6,586,691 B2

(12) United States Patent
Itoigawa et al.

(10) Patent No.: US 6,586,691 B2
(45) Date of Patent: Jul. 1, 2003

(54) ACCELERATION SWITCH

(75) Inventors: Kouichi Itoigawa, Aichi (JP); Hitoshi Muraki, Aichi (JP); Makoto Murate, Aichi (JP)

(73) Assignee: K.K. Tokai Rika Denki Seisakusho (JP)

( * ) Notice: Subject to any disclaimer, the term of this patent is extended or adjusted under 35 U.S.C. 154(b) by 0 days.

(21) Appl. No.: 09/896,571

(22) Filed: Jun. 29, 2001

(65) Prior Publication Data

US 2002/0000363 A1 Jan. 3, 2002

(30) Foreign Application Priority Data

Jul. 3, 2000 (JP) ........................................ 2000-200594

(51) Int. Cl.$^7$ ............................................... H01H 35/02
(52) U.S. Cl. ............................. 200/61.49; 200/61.45 R
(58) Field of Search ........................ 200/61.49, 61.45 R, 200/61.53, 61.45 M

(56) References Cited

U.S. PATENT DOCUMENTS 5,828,138 A  * 10/1998  McIver et al. ............... 180/282
6,080,944 A  *  6/2000  Itoigawa et al. ......... 200/61.45 R
6,336,658 B1 *  1/2002  Itoigawa et al. ............. 180/282

FOREIGN PATENT DOCUMENTS

DE          3509054    *  4/1986
JP          3214531    *  9/1991

* cited by examiner

Primary Examiner—Karl D. Easthom
Assistant Examiner—Lisa Klaus
(74) Attorney, Agent, or Firm—Ackerman Senterfitt

(57) ABSTRACT

An acceleration switch that improves detection sensitivity without being enlarged. The acceleration switch includes a switch body, a fixed electrode arranged in the switch body, and a movable weight arranged in the switch body. The movable weight is displaced when subjected to acceleration. The movable weight includes a movable electrode that contacts the fixed electrode when the movable weight is displaced, and a pair of beams connecting the movable weight and the switch body. The beams pivotally support the movable weight and extend into recesses formed in the movable weight.

11 Claims, 9 Drawing Sheets

ACCELERATION SWITCH

BACKGROUND OF THE INVENTION

The present invention relates to an acceleration switch, and more particularly, to an acceleration switch including a movable electrode that contacts a fixed electrode when subjected to acceleration that exceeds a predetermined value.

Many automobiles are presently equipped with air bag systems. A typical air bag system includes an air bag, an ignitor, and an electronic control unit (ECU). The ECU includes an acceleration sensor, which detects a sudden change in acceleration upon collision of the vehicle. The employment of a mechanical acceleration switch (i.e., safing sensor) has been proposed as such acceleration sensor.

FIGS. 1A to 1C schematically show the structure of a prior art acceleration switch 51. The acceleration switch 51 includes a silicon chip 52 and a substrate 53, which are connected to each other. As shown in FIG. 1B, the silicon chip 52 has a length of L1 and a width of W1. Further, the silicon chip 52 has a hollow portion 52a in which a block-like inertia weight 54 is arranged.

A beam 55 is provided on each long side of the inertia weight 54 and extends from a position offset from the middle of the long side. The beams 55 connect the inertia weight 54 and the silicon chip 52. The inertia weight 54 pivots about the beams 55 at a position offset from the center of gravity of the inertia weight 54. Referring to FIG. 1B, the beams 55 each have a length of T2. Two movable electrodes 56, 57 are arranged on the lower side of the inertia weight 54, as viewed in FIG. 1A. The movable electrodes 56, 57 are located close to each other at the middle of the weight end that is farther from the beams 55.

A hollow portion 53a is defined in the upper surface of the substrate 53. A fixed electrode 58 is formed in the hollow portion 53a at a position corresponding to the movable electrodes 56, 57. The movable electrodes 56, 57 are normally separated from the fixed electrode 58.

When the acceleration switch 51 is subjected to acceleration, inertial force pivots the inertia weight 54 about the axis of the beams 55 in a downward direction (the direction indicated by arrow G in FIG. 1A). When the acceleration becomes greater than or equal to a predetermined value, the inertia weight 54 pivots in a direction indicated by arrow F in FIG. 1A, and the movable electrodes 56, 57 contact the fixed electrode 58. When the value of acceleration is small, the movable electrodes 56, 57 do not contact the fixed electrode 58. Accordingly, the acceleration switch 51 is actuated only when the acceleration becomes greater than or equal to a predetermined value.

To actuate the acceleration switch 51 at a relatively small acceleration, the beams 55 may be thinned or elongated. However, the formation of thinner beams 55 has physical limitations and is thus not effective. Further, the formation of longer beams 55 limits miniaturization. For example, when the length of the beams 55 is changed to T3 (T2<T3) as shown in FIG. 2, the width W2 of the silicon chip 52 is increased by 2×T3−2×T2 in comparison to when the width of the silicon chip 52 is W1 (FIG. 1B). This increases the area of the silicon chip 52 and enlarges the acceleration switch 51.

SUMMARY OF THE INVENTION

It is an object of the present invention to provide an acceleration switch having improved detection sensitivity while avoiding enlargement.

To achieve the above object, the present invention provides an acceleration switch including a switch body, a fixed electrode arranged in the switch body, and a movable weight arranged in the switch body. The movable weight is displaced when subjected to acceleration. The movable weight includes a movable electrode that contacts the fixed electrode when the movable weight is displaced, a recess formed in a side of the movable weight, and a beam connecting the movable weight and the switch body. The beam pivotally supports the movable weight and extends into the recess.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1A:
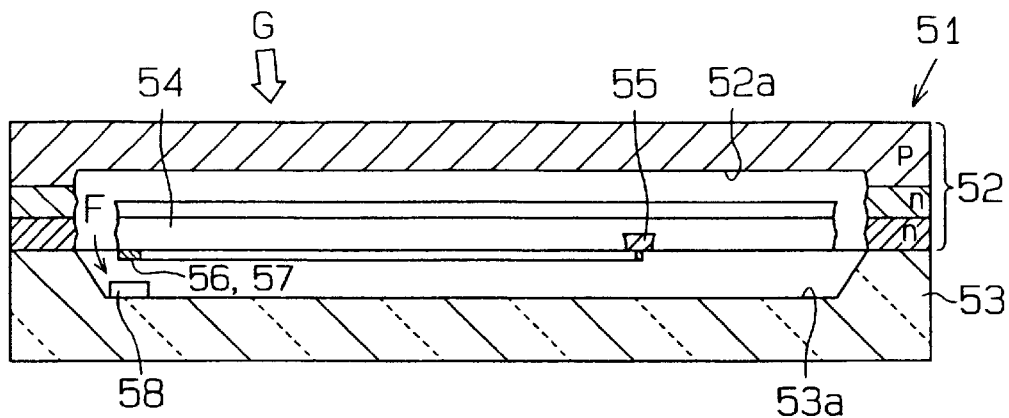
FIG. 1A is a schematic cross-sectional view showing a prior art acceleration switch.

In the drawings, like numerals are used for like elements throughout.

Figure 3A:
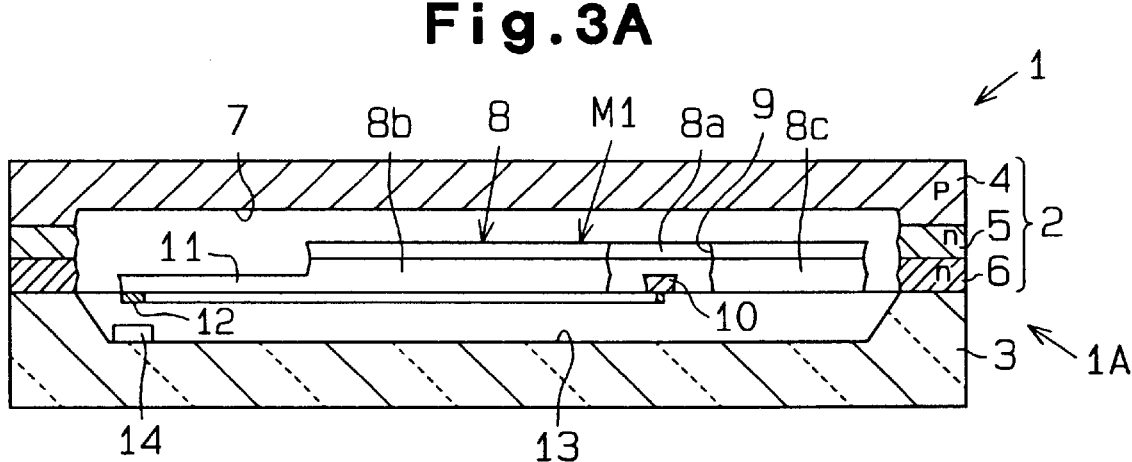
FIG. 3A is a schematic cross-sectional view showing an acceleration switch according to a first embodiment of the present invention.

FIG. 3A is a schematic cross-sectional view showing an acceleration switch 1 according to a first embodiment of the present invention. As shown in FIG. 3A, the acceleration switch 1 has a switch body 1A, which is formed by connecting a silicon chip 2 to a substrate 3.

The silicon chip 2 includes a chip body 4 and a double-layer structure of epitaxial growth layers 5, 6. The chip body 4 is rectangular and formed from p-type monocrystal silicon of (110) orientation. The epitaxial growth layers 5, 6 are superimposed on one side of the chip body 4 and formed from n-type monocrystal silicon. The thickness of the chip body 4 is 500 to 600 µm. The thickness of each of the epitaxial growth layers 5, 6 is about 15 µm. Thus, the thickness of the two epitaxial growth layers 5, 6 is about 30 µm. To facilitate illustration, the thickness of the epitaxial growth layers 5, 6 is exaggerated. The silicon chip 2 has the same length L1 and width W1 as the silicon chip 52 of FIG. 1.

A rectangular hollow portion 7 is formed in the lower side of the chip body 4, as viewed in FIG. 3A. The hollow portion 7 has a depth of about 100 µm and is thus deeper than the thickness of the two epitaxial growth layers 5, 6. The hollow portion 7 accommodates a movable portion (movable weight) M1, which includes an inertia weight 8, two beams 10, and a plurality of flexible plates 11. In the preferred embodiment, the beams 10 are formed integrally with the inertia weight 8.

The inertia weight 8 is generally plate-like and has a thickness of about 20 µm. A pair of cutaway portions (recesses) 9 are formed on sides of the inertia weight 8 in a direction perpendicular to the longitudinal direction of the inertia weight 8. The pairs of cutaway portions 9 are offset from the middle of the inertia weight 8, which is indicated by a dot in FIG. 9A.

Figure 3B:
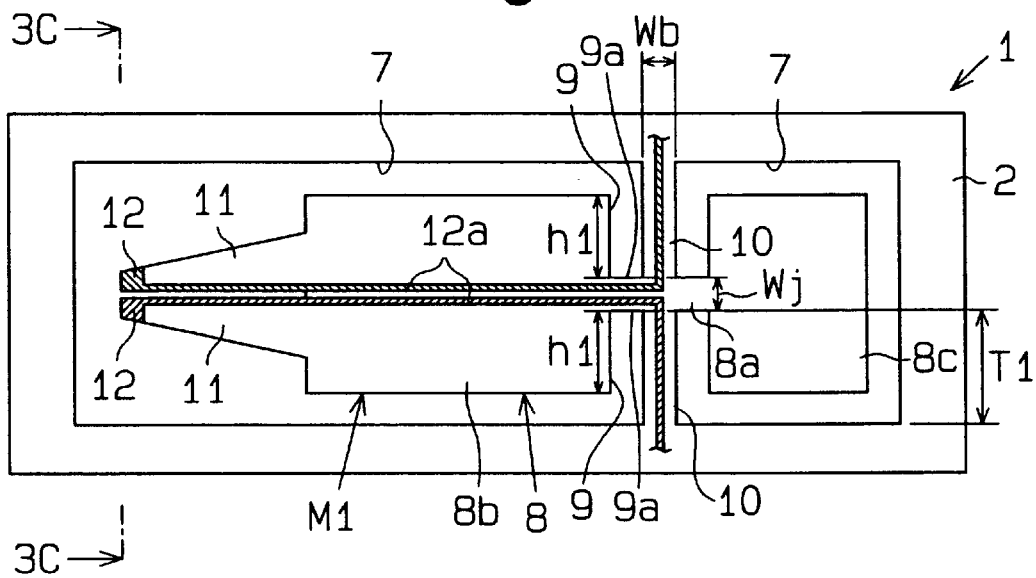
FIG. 3B is a schematic lower view showing the structure of the acceleration switch of FIG. 3A.

The inertia weight 8 has a joint 8a, a weight body 8b, and a balancer 8c. The joint 8a extends between and perpendicular to the beams 10. The weight body 8 is connected to one end of the joint 8a. As shown in FIG. 3B, the width Wj of the joint 8a in the preferred embodiment is about the same as the width Wb of the beams 10.

The two beams 10 are perpendicular to the longitudinal direction of the silicon chip 2 and toward the associated walls of the silicon chip 2 in the hollow portion 7. The beams 10 are flexible and each have a thickness of about 7.5 µm, which is about three eighths of the thickness of the inertia weight 8. Further, the beams 10 each have a length of T1.

Figure 1B:
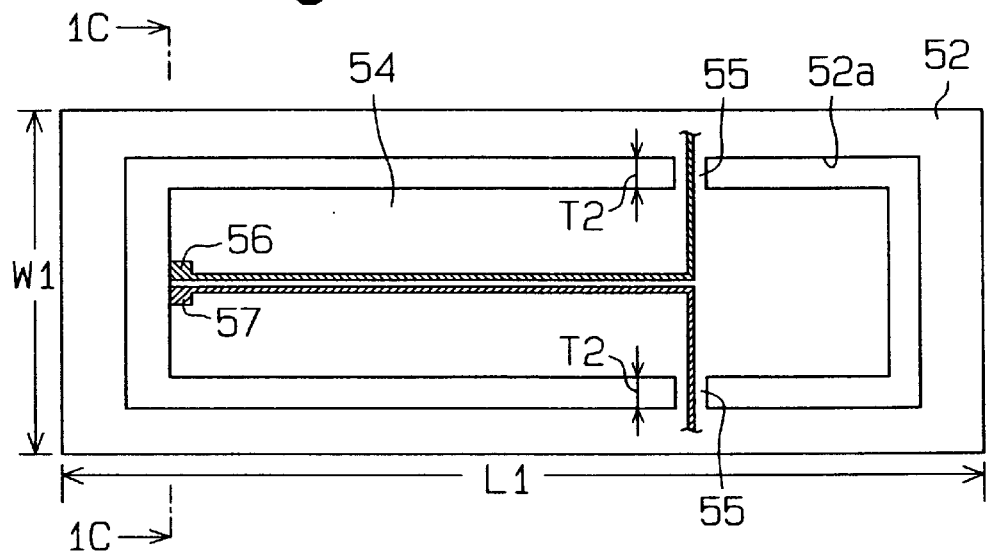
FIG. 1B is a schematic lower view showing a silicon chip showing the structure of the acceleration switch of FIG. 1A.
Figure 1C:
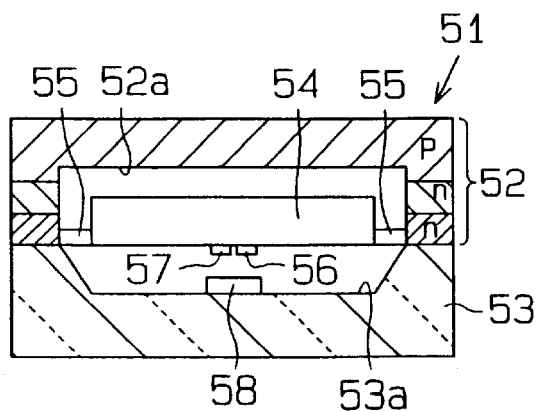
FIG. 1C is a cross-sectional view taken along line 1C—1C in FIG. 1B.
Figure 2:
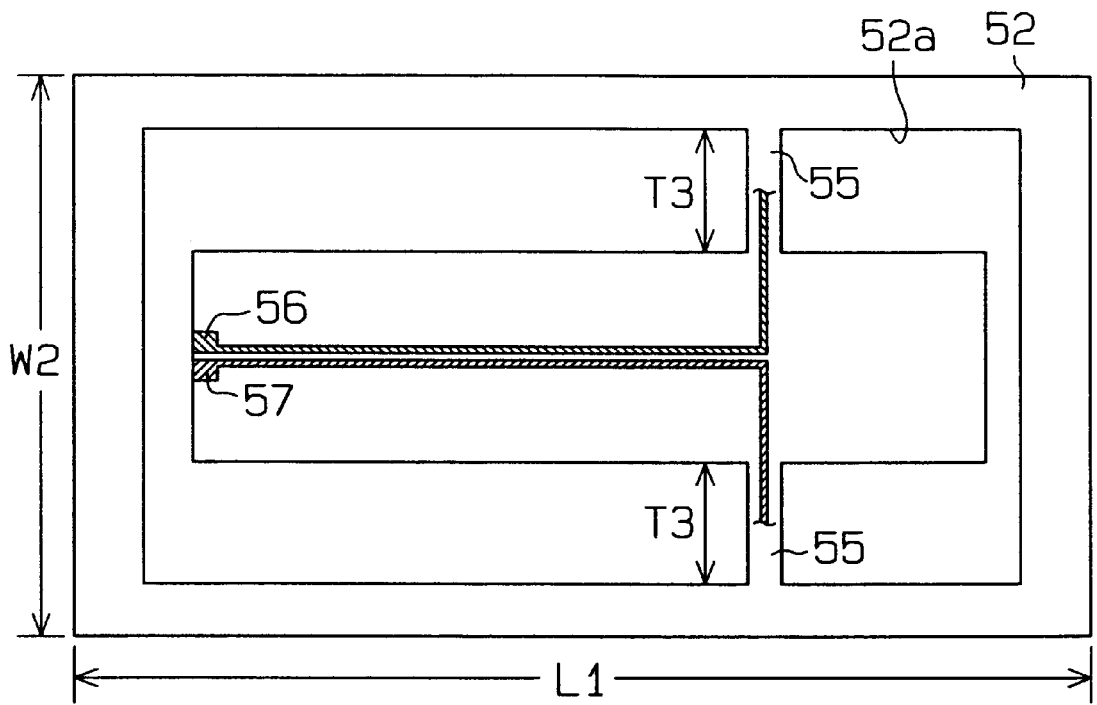
FIG. 2 is a lower view showing the structure of another prior acceleration switch.

In the preferred embodiment, the length T1 of each beam 10 is about 4.4 times the beam length T2 of the prior art acceleration switch 51 (FIG. 1B). One end of each beam 10 is integrally connected with the side surface of the joint 8a, and the other end of each beam 10 is connected to the associated wall of the silicon chip 2. The inertia weight 8 pivots about the beams 10.

The two flexible plates 11 are formed integrally with the weight body 8b on the opposite side of where the cutaway portions 9 are located. That is, the flexible plates 11 are formed on the end of the weight body 8b that is opposite to the end facing the beams 10. As shown in FIG. 3B, the flexible plates 11 are each trapezoidal when seen from above and become narrower toward the distal end. The thickness of each flexible plate 11 is about the same as the thickness of the beams 10 and is about 7.5 µm. The flexible plates 11 are formed at the middle of the end surface of the inertia weight 8. The lower surfaces of the flexible plates 11 are flush with the lower surface of the weight body 8b.

The flexible plates 11 are located near each other. More specifically, the gap between the flexible plates 11 is about 10 to 200 µm. In the preferred embodiment, the gap is about 40 µm. A movable electrode 12 is provided on the distal end of the lower side of each movable electrode 12. The width of each movable electrode 12 is about the same as the width of the distal portion of each flexible plate 11. The movable electrodes 12 are connected to external terminals (not shown) by wiring patterns 12a formed along the flexible plates 11, the inertia weight 8, and the beams 10.

The substrate 3 is rectangular and has the same shape as the silicon chip 2. In the preferred embodiment, a glass substrate is used as the insulative substrate 3. Alternatively, substrates made of other materials such as silicon may be used as the substrate 3. A rectangular hollow portion 13 is defined in the substrate 3. The hollow portion may be formed by, for example, etching the portion of the substrate 3 corresponding to the hollow portion 7 of the silicon chip 2. The substrate 3 and the silicon chip 2 are connected to each other using an anode connecting technique that is know in the art. The substrate 3 and the silicon chip 2 may also be connected with each other by using, for example, an adhesive.

A fixed electrode 14 is formed on the bottom surface of the hollow portion 13 at a position corresponding to the movable electrodes 12. The movable electrodes 12 contact the fixed electrode 14 when the inertia weight 8 pivots and the flexible plates 11 incline toward the substrate 3. This electrically connects the movable electrodes 12 via the fixed electrode 14.

An example of a procedure for manufacturing the acceleration switch 1 of the preferred embodiment through a surface micro-machining technique will now be discussed with reference to FIGS. 4 to 7.

The substrate 3 used in the acceleration switch 1 is manufactured by first etching a rectangular glass substrate (e.g., Pyrex glass) to form the hollow portion 13 having a predetermined shape. Then, after masking the glass substrate, conductive metal (e.g., aluminum Al) is sputtered to form the fixed electrode 14 on the bottom surface of the hollow portion 13. In lieu of a dry film forming process such as sputtering, a wet film forming process such as electroless plating may be employed.

To manufacture the silicon chip 2, a mask (not shown) is first applied to one side of a chip body 4. The chip body 4 is then photoetched to form an opening in a predetermined portion of the mask. Then, the surface of the chip body 4 undergoes an ion implantation process to implant a predetermined concentration of p-type impurities such as boron. The p-type impurities are then thermally diffused. This forms a first high concentration p-type silicon layer (lower p⁺ silicon implantation layer) 21 (FIG. 4B) in the predetermined portion of the silicon chip 2. The portion in which the lower p⁺ silicon implantation layer 21 is formed corresponds to where the hollow portion 7 will be subsequently formed.

Figure 4A:
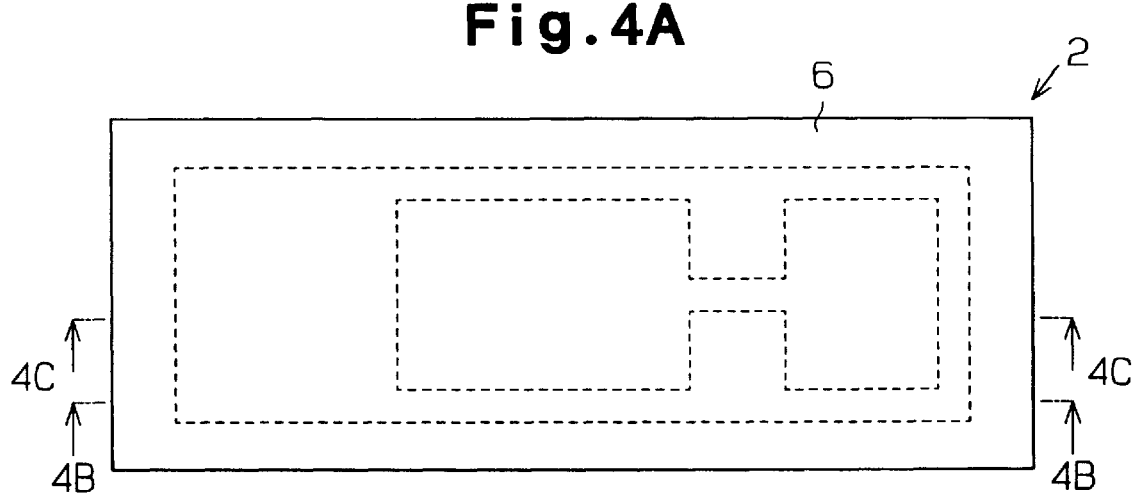
FIG. 4A is a schematic plan view illustrating the manufacturing procedure of the acceleration switch of FIG. 3A.
Figure 4B:
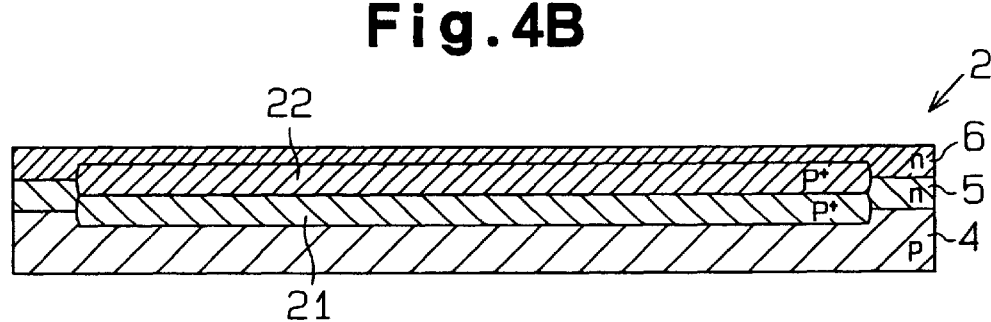
FIG. 4B is a cross-sectional view taken along line 4B—4B in FIG. 4A.

Vapor phase epitaxy is performed to form the first epitaxial growth layer 5, which is made of n-type monocrystal silicon, on the entire surface of the chip body 4 on which the p⁺ silicon implantation layer 21 has been applied. As a result, the p⁺ silicon implantation layer 21 is implanted in the first epitaxial growth layer 5 (FIG. 4B). A mask (not shown) is then applied to the first epitaxial growth layer 5 and photoetched to form an opening at a predetermined portion of the mask. In this state, for example, ion implantation is performed to implant p-type impurities. The implanted p-type impurities are then thermally diffused. This forms a second high concentration p-type silicon layer (upper p⁺ silicon implantation layer) 22 in the first epitaxial growth layer 5. The upper p⁺ silicon implantation layer 22 extends to the lower p⁺ silicon implantation layer 21. The portion in which the upper p⁺ silicon implantation layer 22 is formed also corresponds to the hollow portion 7. The portion that is masked when forming the upper p⁺ silicon implantation layer 22 corresponds to the inertia weight 8.

Figure 4C:
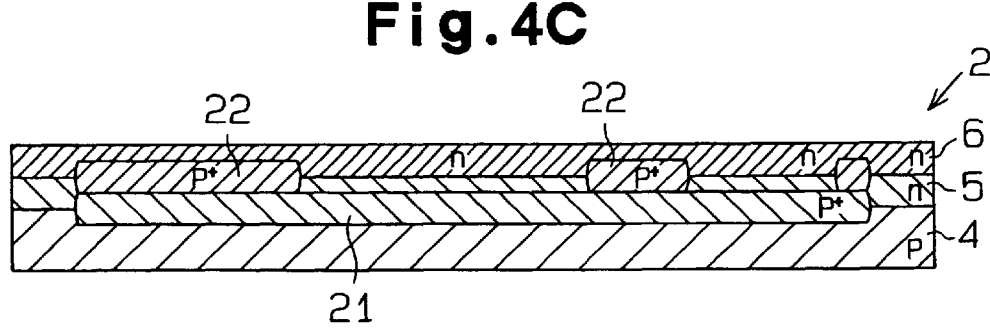
FIG. 4C is a cross-sectional view taken along line 4C—4C in FIG. 4A.
Figure 5A:
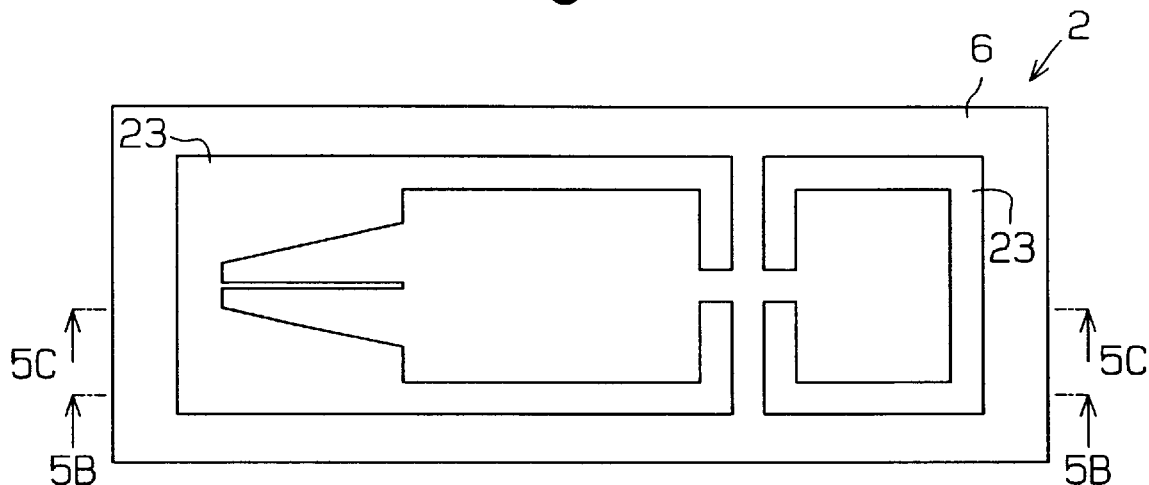
FIG. 5A is a schematic plan view illustrating the manufacturing procedure of the acceleration switch of FIG. 3A.
Figure 5B:
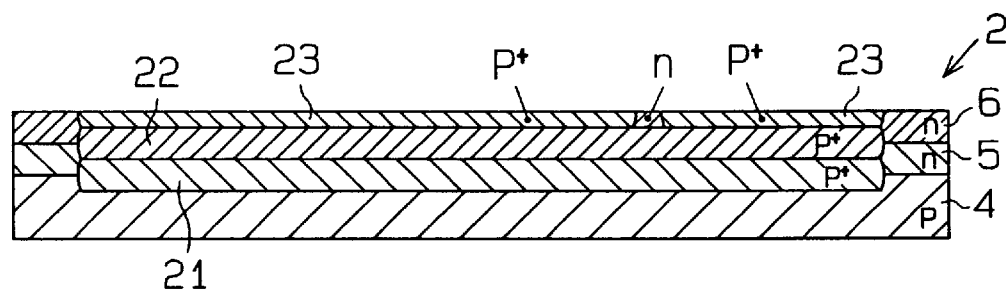
FIG. 5B is a cross-sectional view taken along line 5B—5B in FIG. 5A.
Figure 5C:
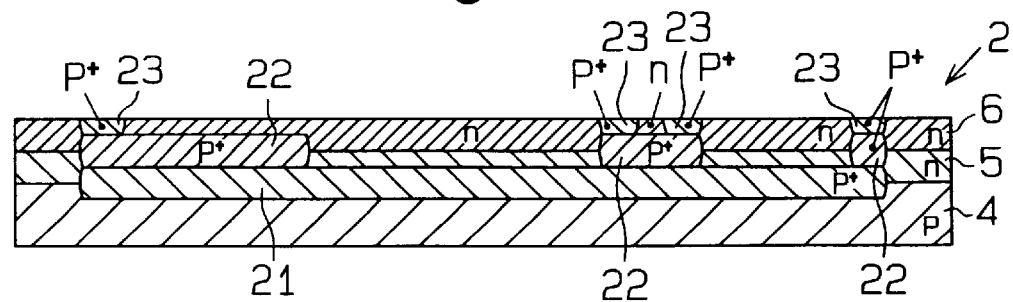
FIG. 5C is a cross-sectional view taken along line 5C—5C in FIG. 5A.
Figure 6A:
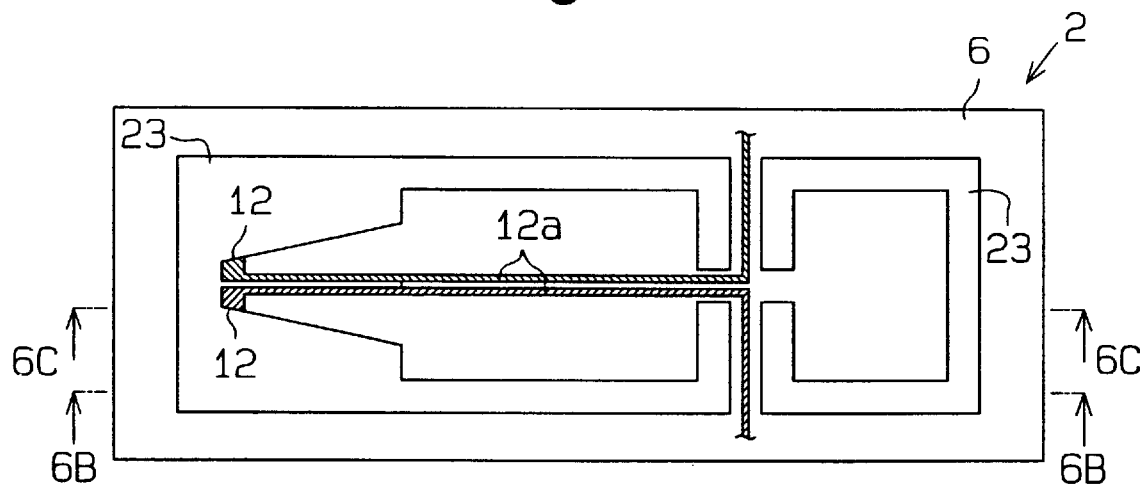
FIG. 6A is a schematic plan view illustrating the manufacturing procedure of the acceleration switch of FIG. 3A.
Figure 6B:
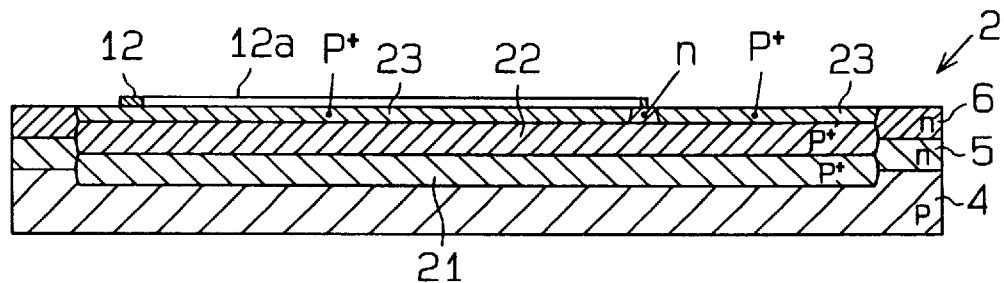
FIG. 6B is a cross-sectional view taken along line 6B—6B in FIG. 6A.
Figure 6C:
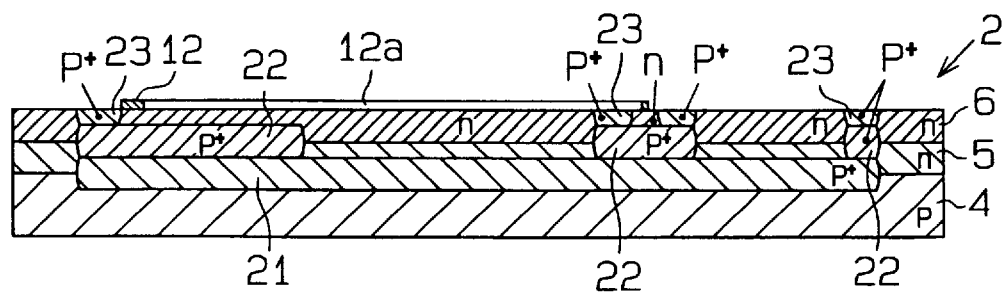
FIG. 6C is a cross-sectional view taken along line 6C—6C in FIG. 6A.

Subsequently, vapor phase epitaxy is performed to form the second epitaxial growth layer 6, which is made of n-type monocrystal silicon, on the entire surface of the first epitaxial growth layer 5. As a result, the upper p⁺ silicon implantation layer 22 is implanted in the second epitaxial growth layer 6 (FIGS. 4B, 4C). Then, a mask (not shown) is applied to the second epitaxial growth layer 6 and photoetched to form openings at predetermined portions. P-type impurities are then implanted and thermally diffused. This forms a third high concentration p-type silicon layer (p⁺ silicon diffusion layer) 23 in the first and second epitaxial growth layers 5, 6 (FIGS. 5B and 5C). The p⁺ silicon diffusion layer 23 extends to the upper p⁺ silicon implantation layer 22. The portions in which the third high concentration p-type silicon layer (p⁺ silicon diffusion layer) 23 is formed correspond to the hollow portion 7. The portions that are masked when forming the p⁺ silicon diffusion layer 23 correspond to the inertia weight 8, the beams 10, and the flexible plates 11. In other words, the p⁺ silicon diffusion layer 23 is formed to leave space for forming the inertia weight 8, the beams 10, and the flexible plates 11.

After the high concentration p-type silicon layer forming process is completed, the silicon chip is heated in the presence of oxygen or in an atmospheric environment to form an oxidation film (not shown) on the upper and lower surfaces of the silicon chip 2. In this state, aluminum (Al) is sputtered or vapor deposited on the oxidation film. Then, photolithography is performed on the silicon chip 2. This forms the movable electrodes 12 and the wiring pattern 12a on the surface of the silicon chip 2 in correspondence with the locations where the inertia weight 8 and the flexible plates 11 will be formed.

Subsequently, sputtering or vapor deposition of, for example, tungsten (W) or molybdenum (Mo) is performed on the silicon chip 2. The silicon chip 2 then undergoes lithography. This forms a metal protection film (not shown) having openings. The oxidation film is then removed through the openings of the metal protection film to expose the upper surface of the p⁺ silicon diffusion layer 23. Tungsten and molybdenum are sputtered or vapor deposited on the silicon chip 2 since these metals resist hydrofluoric acid.

After the masking process is completed, the silicon chip 2 performs an anode conversion process.

A high concentration hydrofluoric acid (HF) solution, which is an anode conversion acid solution, is filled in an anode conversion treatment tank. Counter electrodes, which are formed from, for example, platinum, and the silicon chip 2, which is faced toward the counter electrodes, are immersed in the hydrofluoric acid solution. A cathode of a direct current power supply is connected to the lower side of the silicon chip 2. An anode of the direct current power supply is connected to the upper side of the silicon chip 2. Thus, direct current flows from the lower surface to the upper surface of the silicon chip 2. This results in the portions formed from high concentration p-type silicon in the silicon chip 2 (i.e., p⁺ silicon implantation layer 21, 22 and the p⁺ silicon diffusion layer 23) becoming porous. Therefore, the first to third high concentration p-type silicon layers 21, 22, 23 are reformed into porous silicon layers.

Figure 3C:
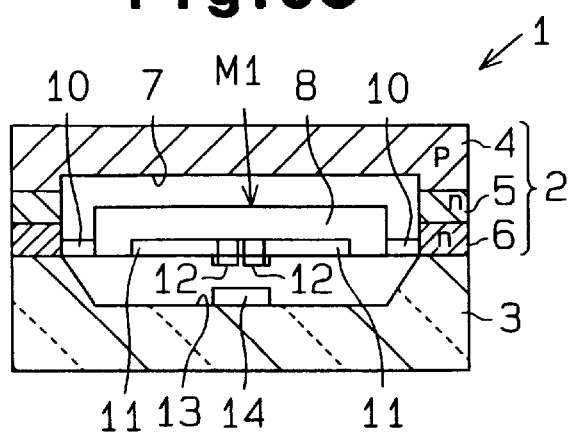
FIG. 3C is a cross-sectional view taken along line 3C—3C in FIG. 3B.
Figure 7A:
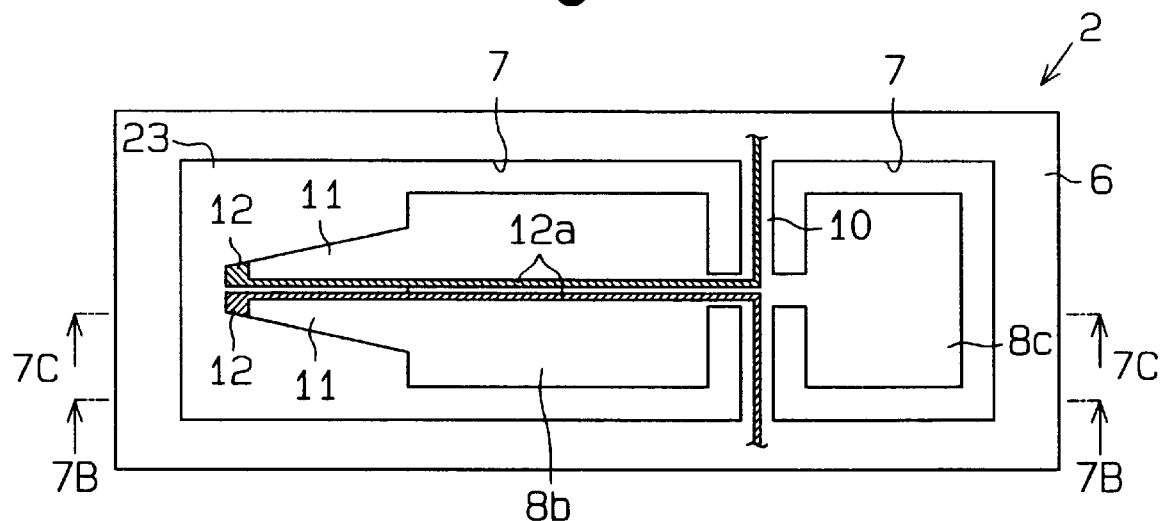
FIG. 7A is a schematic plan view illustrating the manufacturing procedure of the acceleration switch of FIG. 3A.
Figure 7B:
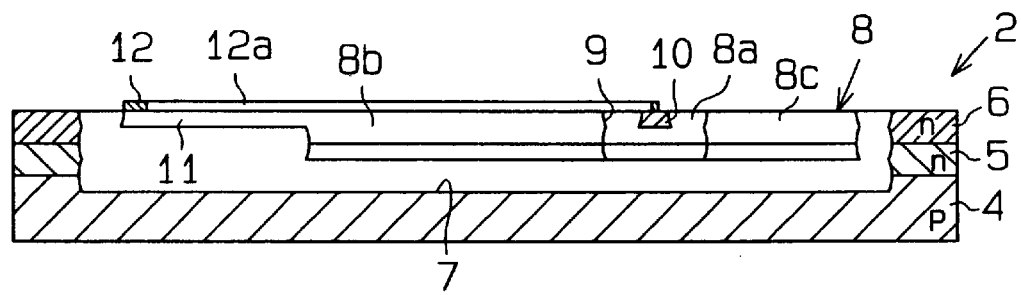
FIG. 7B is a cross-sectional view taken along line 7B—7B in FIG. 7A.
Figure 7C:
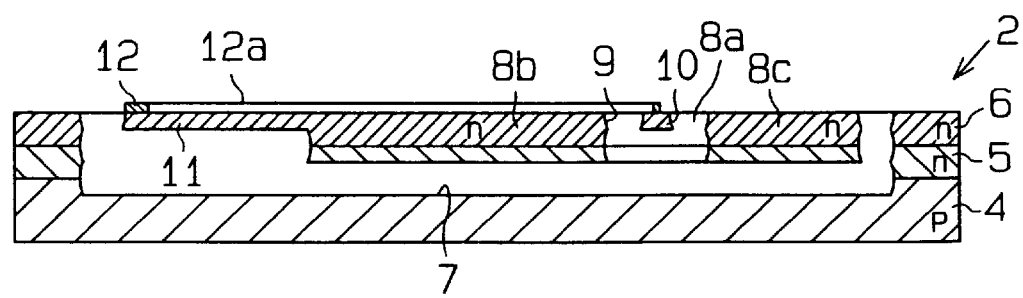
FIG. 7C is a cross-sectional view taken along line 7C—7C in FIG. 7A.

Subsequent to the anode conversion process and prior to the removal of the metal protection film, the silicon chip 2 undergoes alkali etching. A substance such as tetramethylammonium hydroxide (TMAH) is used as the etching agent. The etching dissolves the porous silicon layers. The porous silicon layer, which define a reformed portion, is easily dissolved by alkali in comparison to the non-porous silicon layers, which define a non-reformed portion. Thus, the porous silicon layers are easily hollowed out to form the hollow portion 7. This also forms the movable portion M1 in the hollow portion 7 (FIGS. 7A–7C). The silicon chip 2 is then reversed and attached to the substrate 3. This completes the acceleration switch 1 of FIG. 3.

Figure 8:
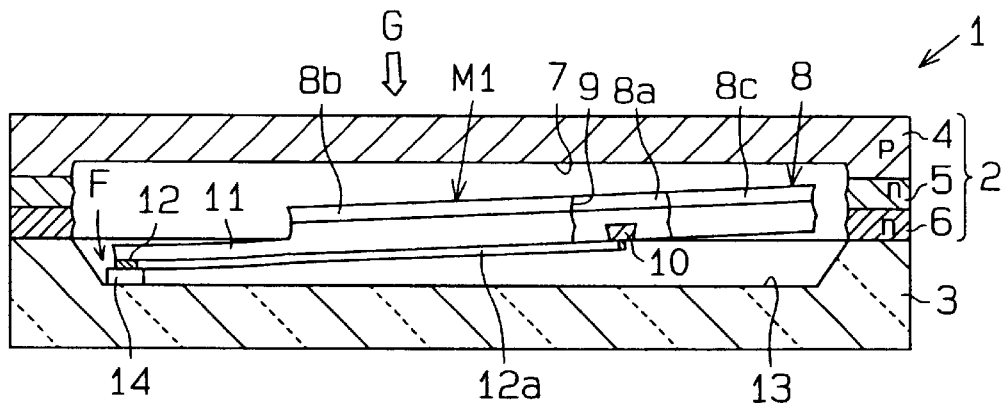
FIG. 8 is a schematic cross-sectional view showing a state in which acceleration is applied to the acceleration switch of FIG. 3A.

The operation of the acceleration switch 1 will now be discussed. Referring to FIG. 8, when the acceleration switch 1a is subjected to acceleration, an inertial force is applied to the movable portion M1 in the direction of arrow G. When the acceleration applied to the acceleration switch 1 becomes greater than or equal to a predetermined value, the inertia weight 8 pivots downward about the beams 10 as shown by arrow F in FIG. 8. The weight body 8b is heavier than the balancer 8c. Thus, although inertial force is also applied to the balancer 8c, the weight body 8b is pivoted downward.

The joint 8a is thicker than the beams 10 and thus more rigid than the beams 10. Hence, even if the joint 8a is subjected to acceleration that elastically deforms the beams 10, the joint 8a does not flex. This integrally pivots the weight body 8b and the balancer 8c. The weight body 8b is pivoted downward and the balancer 8c is pivoted upward. As a result, the movable electrodes 12 contact the fixed electrode 14. This conducts electricity between the movable electrodes 12 through the fixed electrode 14 and actuates the acceleration switch 1.

The balancer 8c causes a time delay from when inertial force, which is produced by acceleration, is applied to the inertia weight 8 to when the inertia weight 8 starts to pivot. Response to acceleration applied to the inertia weight 8 is delayed by the balancer 8c. Therefore, the movable electrodes 12 do not contact the fixed electrode 14 unless acceleration is applied to the inertia weight 8 for a predetermined time. Accordingly, the acceleration switch 1 is not actuated when momentary acceleration is applied to the inertia weight 8. In other words, the acceleration switch 1 is not actuated when, for example, noise, which is produced by vibrations and which acts in the same manner as acceleration, is applied to the inertia weight 8.

When the acceleration switch 1 is subjected to acceleration that is smaller than the predetermined value, the inertia weight 8 does not pivot about the beams 10. Thus, even if the beams 10 flex for a certain amount, the inertia weight 8 is not displaced to a predetermined position and electricity is not conducted between the movable electrodes 12. In other words, the acceleration switch 1 is actuated only when the acceleration switch 1 is subjected to acceleration that is greater than or equal to the predetermined value.

The equations listed below are satisfied by the acceleration switch 1. In the equations, the distance between the movable electrodes 12 and the fixed electrode 14 is represented by δ (mm), the acceleration required for the movable electrodes 12 to contact the fixed electrode 14 (i.e., the acceleration produced by the inertial force applied to the inertia weight 8) is represented by G (m/s$^2$), and the coefficient of spring of the beams 10 is represented by k.

$$\delta = \sin(2 \cdot m^* \cdot G/k) \times (Lm/2 + R)$$

$$k = (\beta \cdot Wb \cdot hb^3 \cdot Gs \cdot 2)/Lb$$

Figure 9A:
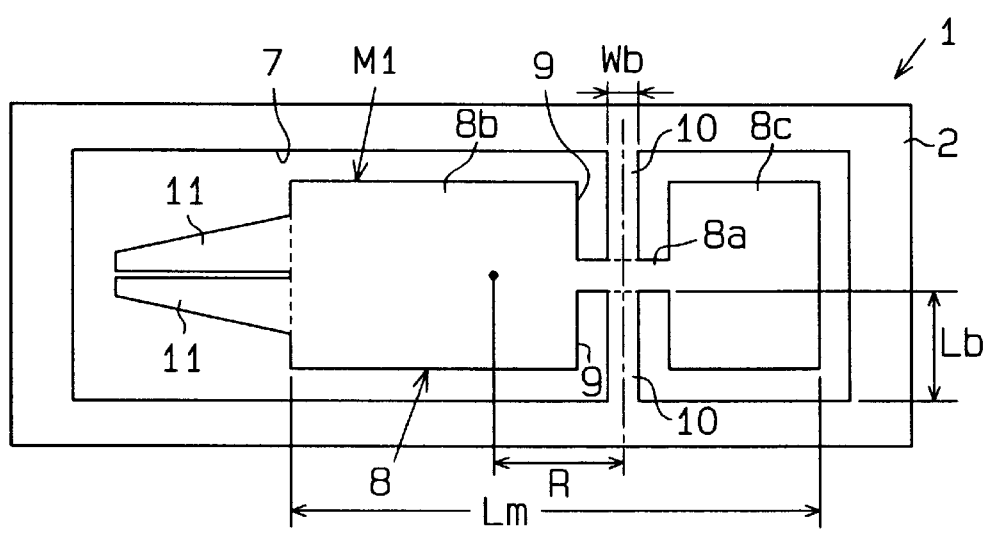
FIG. 9A is a schematic lower view showing a silicon chip of the acceleration switch of FIG. 3A.
Figure 9B:
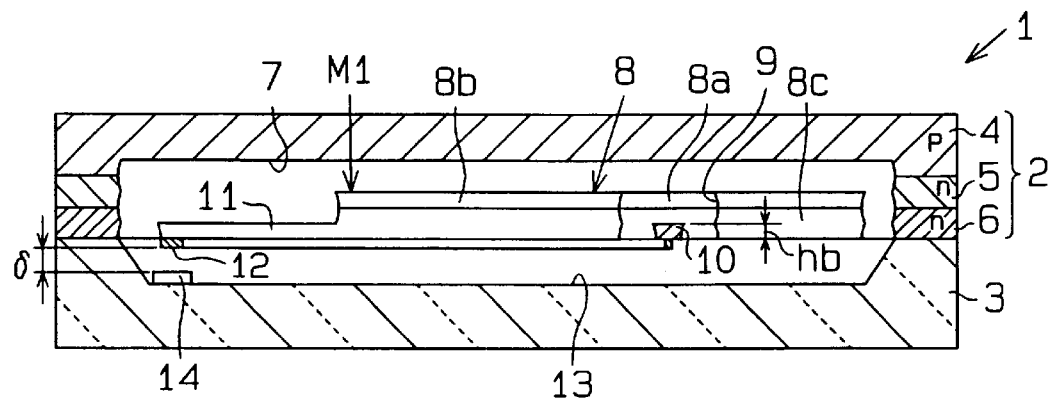
FIG. 9B is a schematic cross-sectional view showing the acceleration switch of FIG. 3A.

Referring to FIGS. 9A and 9B, the length of the weight body 8b is represented by Lm, the mass (kg·m) of the weight body 8b is represented by m*, the distance (mm) between the center of gravity of the inertia weight to the middle of the joint 8a is represented by R. The length (mm) of each beam 10 is represented by Lb, the width (mm) of each beam 10 is represented by Wb, and the thickness (mm) of each beam 10 is represented by hb. The coefficient of torsion of each beam 10 is represented by β, and the transverse elasticity (N/m$^2$) of each beam 10 is represented by Gs.

In accordance with the two equations, the acceleration G changes as the length Lb of each beam 19 changes. More specifically, the acceleration G required for the movable electrodes 12 to contact the fixed electrode 14 decreases as the length Lb of the beam 10 increases.

The inventors of the present invention have confirmed that when, for example, the length Lm of the weight body 8b is 7 mm, the width of the weight body 8b is 1.5 mm, the thickness of the main weight 8b is 0.015 mm, the distance δ between the movable electrodes 12 and the fixed electrode 14 is 0.02 mm, and the length T1 of each beam 10 is about 0.88 mm (Lb=T1=about 0.88 mm), the acceleration G required for contact between the electrodes 12, 14 is about 2.5 g (m/s$^2$) in which g represents gravitational acceleration.

In comparison, the inventors of the present invention have confirmed that when the beam length T2 of the conventional acceleration switch 51 is 1/4.4 of the beam length T1 and the beam length T2 (Lb) is about 0.2 mm, the acceleration G required for contact between the electrodes 12, 14 increases to about 11g (m/s$^2$). This is about four times the acceleration G required for contact between the electrodes 12, 14 when the beam length is T1.

Accordingly, the acceleration G required for contact between the movable and fixed electrodes 12, 14 is inversely proportional to the beam length Lb. The desired threshold value of acceleration is easily obtained by varying the beam length Lb.

The acceleration switch 1 of the preferred embodiment has the advantages described below.

(1) A pair of cutaway portions 9, or recesses, extending perpendicular to the longitudinal axis of the inertia weight 8 are formed on sides of the weight 8. Each of the beams 10 is formed in one of the cutaway portions 9. This increases the beam length T1 by the length h1 of the cutaway portions 9 without increasing the silicon chip area. Thus, the beams 10 are elastically deformed easily and enable the inertia weight 8 to be pivoted by a small acceleration. Accordingly, the sensitivity of the acceleration switch 1 to acceleration is improved without enlarging the switch 1.

(2) The beams 10 support the inertia weight 8 at the joint 8a. Thus, the inertia weight 8 is pivoted smoothly.

(3) The inertia weight 8 is provided with the balancer 8c. This delays the response of the inertia weight 8 when the acceleration switch 1 is subjected to acceleration. Thus, the inertia weight 8 is not pivoted by momentary acceleration. This prevents inadvertent actuation of the acceleration switch 1 when subjected to noise-like acceleration (e.g., sudden vibration).

(4) When the acceleration switch 1 is subjected to acceleration, the beams 10 are elastically deformed but the joint 8a is not. Thus, the joint 8a, the weight body 8b, and the balancer 8c are pivoted integrally, and the balancer 8c is not displaced in an undesirable manner.

It should be apparent to those skilled in the art that the present invention may be embodied in many other specific forms without departing from the spirit or scope of the invention. Particularly, it should be understood that the present invention may be embodied in the following forms.

Figure 10:
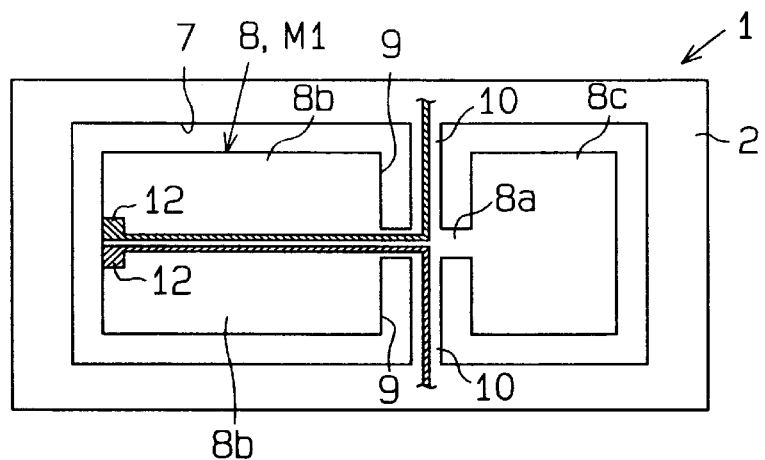
FIG. 10 is a schematic lower view showing a silicon chip of an acceleration switch according to a further embodiment of the present invention.

As shown in FIG. 10, the flexible plates 11 may be eliminated, and the movable electrodes 12 may be formed on the weight body 8b.

Figure 11A:
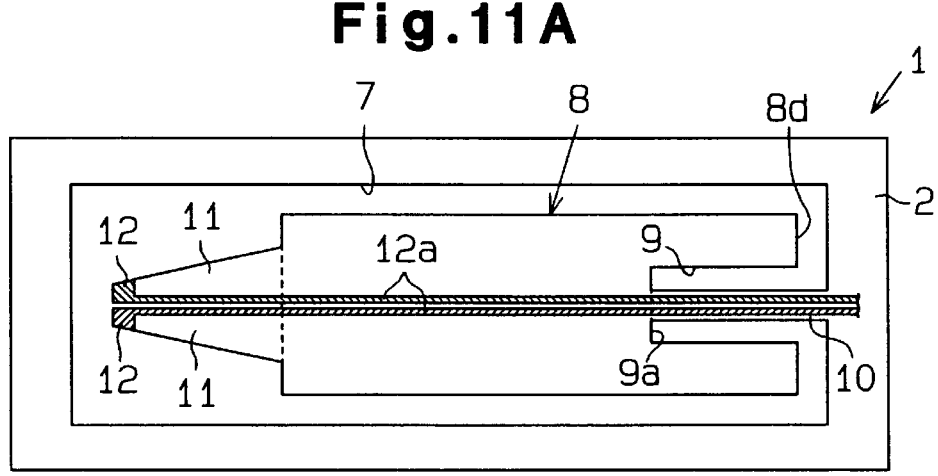
FIG. 11A is a schematic lower view showing a silicon chip of an acceleration switch according to a further embodiment of the present invention.

As shown in FIG. 11A, a cutaway portion 9 may be formed in one end 8d of the inertia weight 8, and a single beam 10 extending between the cutaway portion 9 and connected to the inertia weight 8 may be formed. In this case, since there is only one beam, the sensitivity of the acceleration switch 1 is further improved.

Figure 11B:
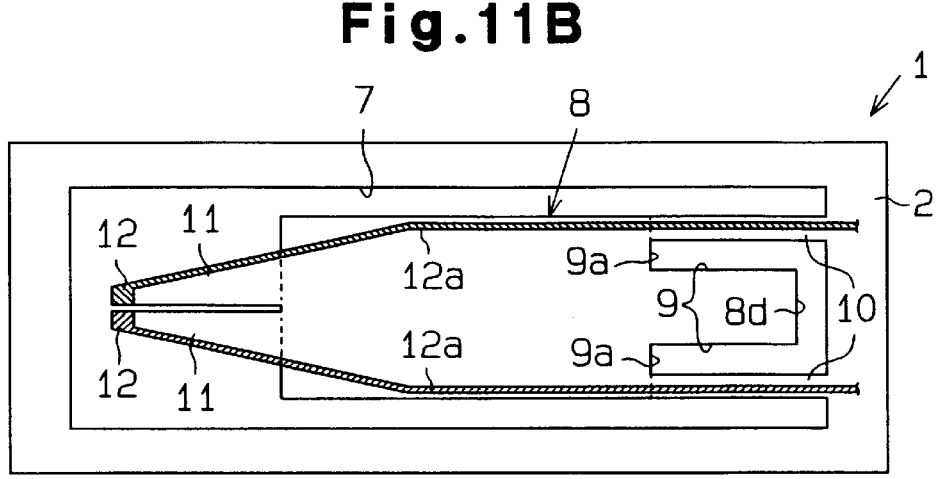
FIG. 11B is a schematic lower view showing a silicon chip of an acceleration switch according to a further embodiment of the present invention.

As shown in FIG. 11B, a pair of cutaway portions 9 extending in the longitudinal direction of the inertia weight 8 and spaced from each other by a predetermined distance may be formed in the end 8d of the inertia weight, and a beam 10 may be formed between each cutaway portion 9 and the hollow portion 7. This further stabilizes the pivoting of the inertia weight 8.

The beams 10 may be formed in any part of the corresponding cutaway portion 9.

The width Wj of the joint 8a may be equal to the width Wb of each beam 10, and the thickness of the joint 8a may be equal to the thickness hb of each beam 10. In this case, the joint 8a functions in the same manner as the beams 10 and enables the weight body 8b to be pivoted by a smaller acceleration.

The balancer 8c may be eliminated. This would make the acceleration switch 1 more compact.

The width Wj of the joint 8a is not restricted to any value. The width Wj may be such that the joint 8a is more rigid than the beams 10.

The present examples and embodiments are to be considered as illustrative and not restrictive, and the invention is not to be limited to the details given herein, but may be modified within the scope and equivalence of the appended claims.

What is claimed is:

1. An acceleration switch comprising:
   a switch body;
   a fixed electrode arranged in the switch body; and
   a movable weight arranged in the switch body, wherein the movable weight is displaced when subjected to acceleration, wherein the movable weight includes a movable electrode that contacts the fixed electrode when the movable, weight is displaced, a cutaway portion formed in a side of the movable weight, and a beam connecting the movable weight and the switch body,
   wherein the beam pivotally supports the movable weight and extends into the cutaway portion, and wherein the cutaway portion separates the weight into a weight body and a balancer, at least one of the weight body and the balancer being spaced from the beam by at least a part of the cutaway portion.

2. The acceleration switch according to claim 1, wherein the movable weight is made of silicon.

3. The acceleration switch according to claim 1, wherein the beam is one of two opposed beams and the cutaway portion is one of two opposed cutaway portions, and the beams extend into the cutaway portions, respectively, in directions that are perpendicular to a longitudinal axis of the switch body, wherein the movable weight includes a joint extending between and intersecting the two beams, a weight body formed on a first end of the joint, and a balancer formed on a second end of the joint.

4. The acceleration switch according to claim 3, wherein the joint is more rigid than each of the beams.

5. The acceleration switch according to claim 4, wherein the movable weight is planar, and the joint, the weight body, and the balancer have the same thickness as measured in a direction perpendicular to the plane of the movable weight, and wherein each of the beams is thinner than the joint.

6. The acceleration switch according to claim 5, wherein the movable weight is made of silicon.

7. The acceleration switch according to claim 3, wherein the movable weight is planar; and the joint, the weight body, and the balancer have the same thickness as measured in a direction perpendicular to the plane of the movable weight, and wherein each of the beams is thinner than the joint.

8. The acceleration switch according to claim 3, wherein the joint has the same rigidity as each of the beams.

9. The acceleration switch according to claim 1, wherein the beam is one of two opposed beams and the cutaway portion is one of two opposed cutaway portions, and the beams extend into the cutaway portions, respectively, in directions that are perpendicular to a longitudinal axis of the switch body, wherein the movable weight includes a joint extending between and intersecting the two beams, and a weight body formed on one end of the joint.

10. The acceleration switch according to claim 9, wherein the movable weight is made of silicon.

11. The acceleration switch according to claim 10, wherein the joint has the same rigidity as each of the beams.

* * * * *